(12) United States Patent
Yoo et al.

(10) Patent No.: US 9,876,233 B2
(45) Date of Patent: Jan. 23, 2018

(54) SECONDARY BATTERY (71) Applicant: SAMSUNG SDI CO., LTD., Yongin-si, Gyeonggi-do (KR)

(72) Inventors: Seungyeol Yoo, Yongin-si (KR); Jongseok Moon, Yongin-si (KR); Huijun Lee, Yongin-si (KR); Junyong Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 261 days.

(21) Appl. No.: 14/513,112

(22) Filed: Oct. 13, 2014

(65) Prior Publication Data
US 2015/0214553 A1 Jul. 30, 2015

(30) Foreign Application Priority Data
Jan. 28, 2014 (KR) .......................... 10-2014-0010647

(51) Int. Cl.
*H01M 4/70* (2006.01)
*H01M 2/26* (2006.01)
*H01M 10/0587* (2010.01)

(52) U.S. Cl.
CPC ............... *H01M 4/70* (2013.01); *H01M 2/26* (2013.01); *H01M 10/0587* (2013.01)

(58) Field of Classification Search
CPC .............................. H01M 2/263; H01M 4/70
USPC ................................................. 429/161, 121
See application file for complete search history.

(56) References Cited

U.S. PATENT DOCUMENTS

| 2003/0215706 A1 | 11/2003 | Alunans et al. |
| 2007/0059594 A1 | 3/2007 | Jeon et al. |

(Continued)

FOREIGN PATENT DOCUMENTS

| CN | 1853290 A | 10/2006 |
| CN | 101047264 A | 10/2007 |

(Continued)

OTHER PUBLICATIONS

EPO Extended Search Report for corresponding European Patent Application No. 11166498.3, dated Sep. 7, 2011 (6 pages).

(Continued)

*Primary Examiner* — Stephen Yanchuk
(74) *Attorney, Agent, or Firm* — Lewis Roca Rothgerber Christie LLP (57) ABSTRACT

A secondary battery according to embodiments of the present invention can reduce or prevent an uncoated portion and the rest of an electrode assembly from being damaged when the uncoated portion and a collector plate are coupled to each other using laser welding. The secondary battery includes a case having an internal space, an electrode assembly accommodated in the case, the electrode assembly having a coated portion coated with an active material and an uncoated portion without the active material, and a collector plate including a first collector plate and a second collector plate coupled to the uncoated portion, wherein first protrusions of the first collector plate and second protrusions of the second collector plate are engaged with each other with the uncoated portion interposed therebetween, and a boundary surface between the first protrusions and the second protrusions is configured to deviate with respect to a direction in which the collector plate is coupled to the uncoated portion.

11 Claims, 5 Drawing Sheets

(56) References Cited

U.S. PATENT DOCUMENTS

| | | |
|---|---|---|
| 2007/0232123 A1 | 10/2007 | Uh |
| 2008/0182166 A1 | 7/2008 | Aota et al. |
| 2009/0087735 A1 | 4/2009 | Yoon et al. |
| 2011/0244314 A1 | 10/2011 | Lee et al. |
| 2014/0106205 A1 | 4/2014 | Lee et al. |

FOREIGN PATENT DOCUMENTS

| | | | |
|---|---|---|---|
| CN | 101399362 | A | 4/2009 |
| EP | 2 043 180 | A1 | 4/2009 |
| EP | 2 388 847 | A1 | 11/2011 |
| JP | 10-106536 | A | 4/1998 |
| JP | 10-261441 | A | 9/1998 |
| JP | 2000-277154 | A | 10/2000 |
| JP | 2003-36834 | A | 2/2003 |
| JP | 2004-213937 | A | 7/2004 |
| JP | 2004-214011 | A | 7/2004 |
| JP | 2005-142026 | A | 6/2005 |
| KR | 2008-0095612 | A | 10/2008 |
| KR | 10-0879297 | B1 | 1/2009 |
| KR | 10-2011-0127621 | A | 11/2011 |

OTHER PUBLICATIONS

KIPO Office Action dated Sep. 21, 2012 for KR 10-2011-0047428 (4 pages).
Office Action dated Apr. 23, 2013 issued in Japanese Patent Application No. JP 2011-110684, (3 pages).
Office Action dated Oct. 26, 2015 issued in cross-reference U.S. Appl. No. 14/092,547, (26 pages).
Office Action dated Jul. 12, 2016 issued in cross-reference U.S. Appl. No. 14/092,547, (10 pages).
Notice of Allowance dated Apr. 24, 2013 issued in Korean Patent Application No. KR10-2011-0047428, (5 pages).
SIPO Office action dated Jun. 28, 2013, with English translation, for corresponding Chinese Patent application 201110130840.6, (27 pages).
EPO Search Report dated Feb. 12, 2015, for corresponding European Patent application 14193700.3, (8 pages).
Machine English Translation of JP 2004-213937 A, published Jul. 29, 2004, 10 pages.
U.S. Office Action dated Apr. 15, 2016 issued in cross-reference U.S. Appl. No. 14/092,547 (25 sheets).
U.S. Office Action dated Jul. 12, 2016 issued in cross-reference U.S. Appl. No. 14/092,547 (10 sheets).
U.S. Notice of Allowance dated Nov. 2, 2016 issued in cross-reference U.S. Appl. No. 14/092,547 (8 sheets).

SECONDARY BATTERY

CROSS-REFERENCE TO RELATED APPLICATION

This application claims priority to and the benefit of Korean Patent Application No. 10-2014-0010647, filed on Jan. 28, 2014, in the Korean Intellectual Property Office, the content of which is incorporated herein by reference in its entirety.

BACKGROUND

1. Field

Aspects of the present invention relate to a secondary battery, which can reduce or prevent an uncoated portion and the rest of an electrode assembly from being damaged when the uncoated portion of the electrode assembly is coupled to a collector plate by laser welding.

2. Description of the Related Art

Generally, a secondary battery refers to a battery that may be charged and discharged, unlike a primary battery, which is not designed to be recharged. Small secondary batteries are widely used (utilized) in advanced electronic equipment, e.g., portable phones, notebook computers and camcorders. Large secondary batteries are widely used for, e.g., driving the motors of electric cars and the motors of hybrid cars. The secondary battery is generally configured such that an electrode assembly is provided within a case, and an electrode terminal is coupled or connected to the electrode assembly through a collector plate welded to the electrode assembly.

Particularly, an uncoated portion of an electrode assembly and a collector plate of a secondary battery are coupled to each other by welding, and welding quality is quite an important factor in determining electrical characteristics of the secondary battery. Accordingly, it is desirable to develop a reliable welding process.

SUMMARY

Aspects of the present invention are directed toward a secondary battery, which can reduce or prevent an uncoated portion and the rest of an electrode assembly from being damaged when the uncoated portion is coupled to a collector plate using (utilizing) laser welding.

According to one or more embodiments of the present invention, a secondary battery includes a case having an internal space, an electrode assembly accommodated in the case, the electrode assembly having a coated portion coated with an active material and an uncoated portion without the active material, and a collector plate coupled to the uncoated portion, the collector plate including a first collector plate including first protrusions and a second collector plate including second protrusions, wherein the first protrusions of the first collector plate and the second protrusions of the second collector plate are engaged with each other with the uncoated portion interposed therebetween, and a boundary surface between the first protrusions and the second protrusions is configured to deviate (e.g., to be at an angle) with respect to a direction in which the collector plate is coupled to the uncoated portion.

Here, the boundary surface between the first protrusions and the second protrusions may be configured to deviate (e.g., to be at an angle) with respect to a direction in which welding beams are applied to couple the collector plate to the uncoated portion.

The second protrusions may be disposed to be vertically symmetrical to the first protrusions.

A supplementary angle may be formed by a first angle formed with respect to a contact surface between the first protrusions and the uncoated portion and a second angle formed with respect to a contact surface between the second protrusions and the uncoated portion.

Each of the first protrusions may have a first inwardly inclined surface, and each of the second protrusions may have a second inclined surface corresponding to the first inclined surface to be engaged with the first protrusions.

In addition, each of the first protrusions may include a first inwardly inclined surface, an extension part extending inwardly from the first inclined surface, and a second inclined surface further extending inwardly from the extension part, and each of the second protrusions may include a first inwardly inclined surface configured to be coupled to the first protrusion, an extension part extending inwardly from the first inclined surface, and a second inclined surface further extending inwardly from the extension part.

A supplementary angle may be formed by a first angle formed between the first inclined surface of the first protrusions and the uncoated portion and a second angle formed between the first inclined surface of the second protrusions and the uncoated portion.

A supplementary angle may be formed by a second angle of the second inclined surface of the first protrusions and a second angle of the second inclined surface of the second protrusions.

An angle formed between at least one of the first inclined surface or the second inclined surface of the first protrusions and the uncoated portion may be 90 degrees or greater.

An angle formed between at least one of the first inclined surface or the second inclined surface of the second protrusions and the uncoated portion may be 90 degrees or less.

Each of the first protrusions may have a first curved surface having a first curvature, and each of the second protrusions may have a second curved surface having a second curvature.

The first curved surface and the second curved surface may have the same curvature.

The first curved surface may be a convex surface or a concave surface, and the second curved surface is shaped to be engaged with the first curved surface.

The uncoated portion and the collector plate may be coupled to each other by laser welding.

As described above, in the secondary battery according to the present invention, a collector plate includes a first collector plate and a second collector plate, and laser welding is performed in a state in which first protrusions of a first collector plate and second protrusions of a second collector plate are engaged with each other with the uncoated portion interposed therebetween, and a boundary surface between the first protrusions and the second protrusions is configured to deviate (e.g., to be at an angle) with respect to a direction in which the collector plate is coupled to the uncoated portion, thereby reducing or preventing welding beams from penetrating into the uncoated portion. Accordingly, it is possible to reduce or prevent the uncoated portion and the electrode assembly from being damaged during the laser welding.

Additional aspects and/or features of the invention will be set forth in part in the description which follows and in part will be obvious from the description or may be learned by practice of the invention.

BRIEF DESCRIPTION OF THE DRAWINGS

The aspects, features and enhancements of the present invention will be more apparent from the following detailed description in conjunction with the accompanying drawings, in which.

DETAILED DESCRIPTION

Hereinafter, examples of embodiments of the present invention will be described in more detail with reference to the accompanying drawings; however, these example embodiments may be embodied in different forms and should not be construed as limited to the embodiments set forth herein. Rather, these embodiments are provided for thoroughness and completeness of this disclosure such that they can easily be made and used by those skilled in the art, and will fully convey the scope of the example embodiments to those skilled in the art. In the drawing figures, dimensions may be exaggerated for clarity of illustration. Like reference numerals refer to like elements throughout. Further, when a first element is described as being "coupled" or "connected" to a second element, the first element may be directly coupled or connected to the second element, or may be indirectly coupled or connected to the second element with one or more intervening elements therebetween.

Figure 1:
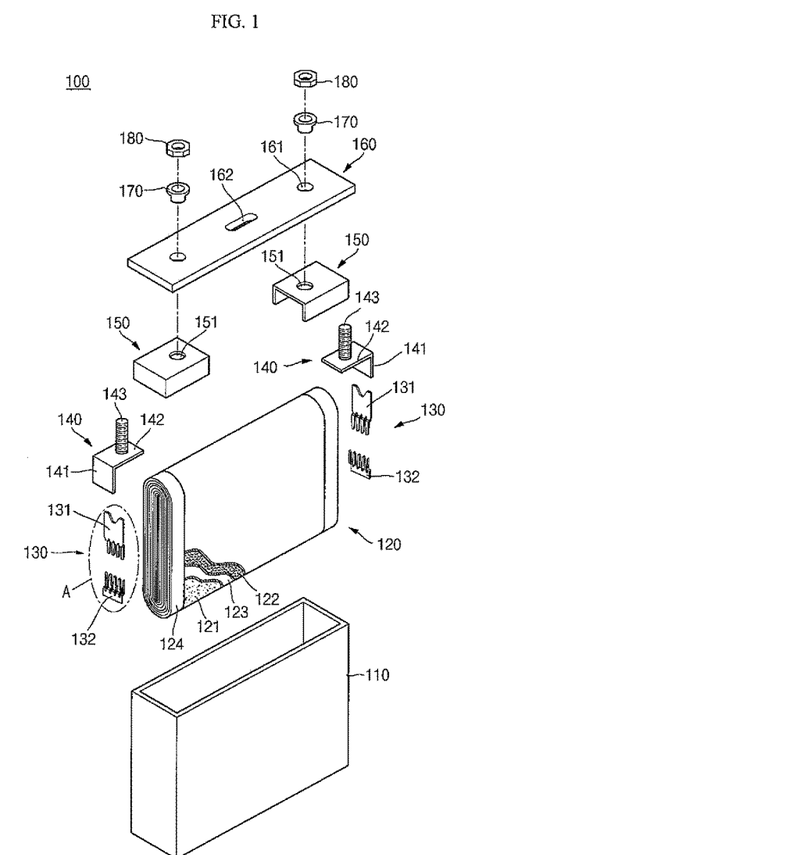
FIG. 1 is an exploded perspective view of a secondary battery according to an embodiment of the present invention.
Figure 2:
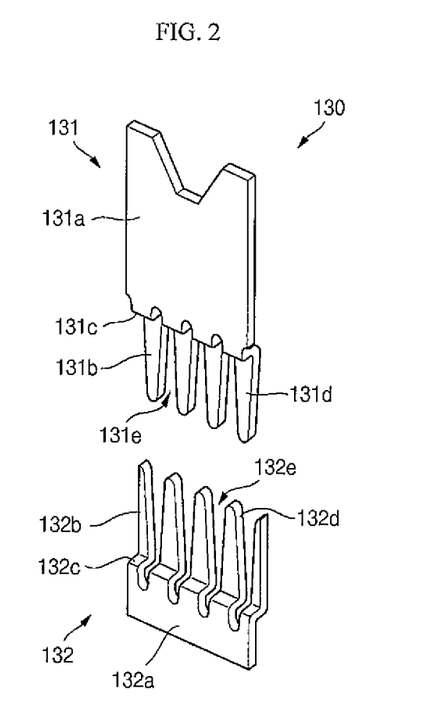
FIG. 2 is a partially enlarged view illustrating the portion 'A' of FIG. 1.
Figure 3:
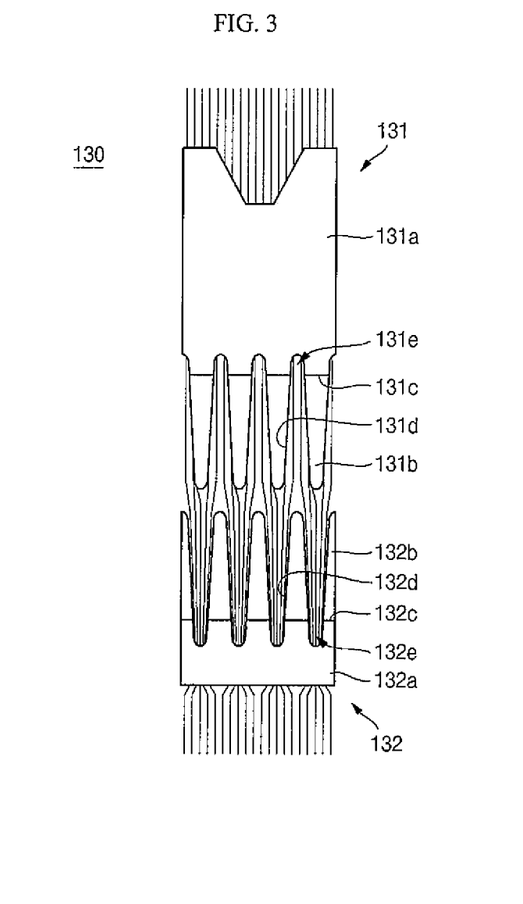
FIG. 3 is a side view illustrating an initial state in which a current collector of FIG. 2 is inserted into an uncoated portion of an electrode assembly.
Figure 4:
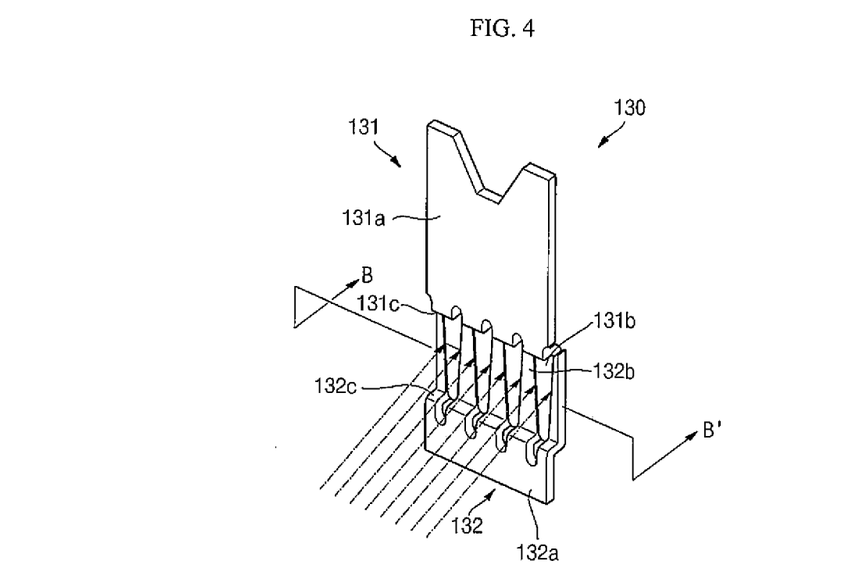
FIG. 4 is a perspective view illustrating a state in which an electrode assembly is coupled with a current collector.
Figure 5:
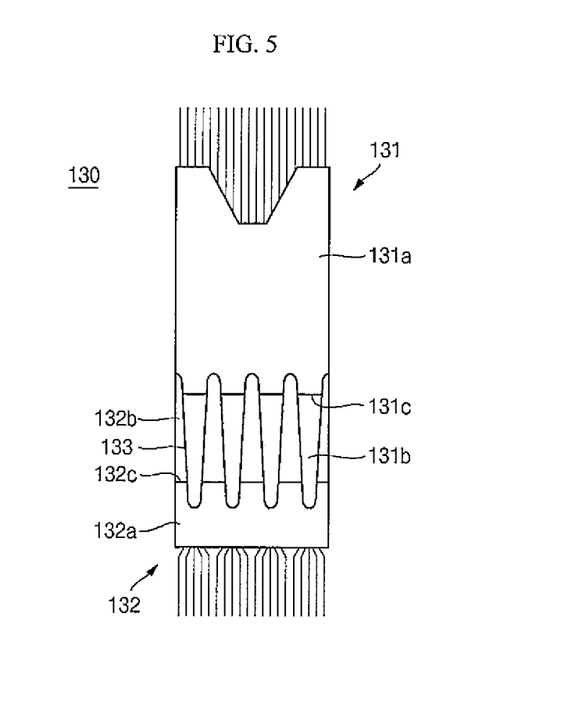
FIG. 5 is a side view illustrating a state in which a current collector of FIG. 2 is inserted into and coupled with an uncoated portion of an electrode assembly.
Figure 6:
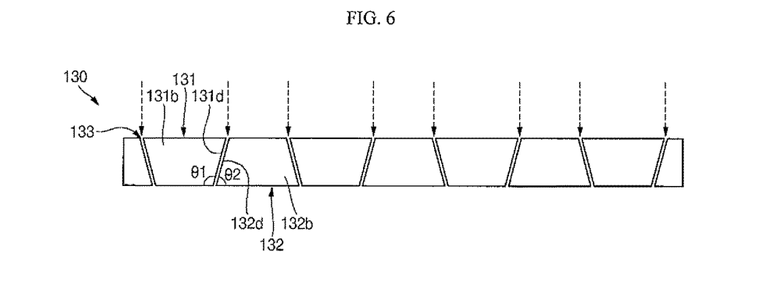
FIG. 6 is a cross-sectional view taken along the line B-B' of FIG. 4.

FIG. 1 is an exploded perspective view of a secondary battery according to an embodiment of the present invention, FIG. 2 is a partially enlarged view illustrating the portion 'A' of FIG. 1, FIG. 3 is a side view illustrating an initial state in which a current collector of FIG. 2 is inserted into an uncoated portion of an electrode assembly, FIG. 4 is a perspective view illustrating a state in which an electrode assembly is coupled with a current collector, FIG. 5 is a side view illustrating a state in which a current collector of FIG. 2 is inserted into and coupled with an uncoated portion of an electrode assembly, and FIG. 6 is a cross-sectional view taken along the line B-B' of FIG. 4.

Referring to FIG. 1, the secondary battery 100 according to an embodiment of the present invention includes a case 110, an electrode assembly 120 incorporated in the case 110, a collector plate 130 electrically coupled or connected to the electrode assembly 120, a collector terminal 140 electrically coupled or connected to the collector plate 130, a first dielectric member 150 through which the collector terminal 140 passes, a cap plate 160 coupled to a top portion of the first dielectric member 150, and a second dielectric member 170 that passes through the cap plate 160 and coupled to the collector terminal 140. In addition, a nut 180 may further be coupled to the collector terminal 140.

The case 110 is formed of a hexahedron shape or the like. In addition, the case 110 has an internal space. The case 110 is made of a conductive metal, such as aluminum, an aluminum alloy or nickel plated steel.

The electrode assembly 120 is incorporated into the case 110. The electrode assembly 120 includes a positive electrode plate 121, a negative electrode plate 122 and a separator 123 interposed therebetween. The electrode assembly 120 is formed in a jelly roll configuration in which the positive electrode plate 121, the negative electrode plate 122 and the separator 123 are stacked and wound. For brevity, the electrode assembly 120 is shown as singularly provided in the case 110, but a plurality of the electrode assemblies 120 may be provided in the case 110.

In addition, the electrode assembly 120 includes an uncoated portion 124 provided at either end of the case 110 or either end of the electrode assembly 120. The uncoated portion 124 includes a pair of portions where one portion formed at one end of the electrode assembly 120 is to be coupled or connected to the positive electrode plate 121, and another portion formed at the other end of the electrode assembly 120 is to be coupled or connected to the negative electrode plate 122.

The uncoated portion 124 is arranged according to the shape of the collector plate 130 to be coupled to the collector plate 130. The uncoated portion 124 may be coupled to the collector plate 130 by welding in a state in which it is coplanar with the collector plate 130, or in a state in which it protrudes further to an upper portion of the collector plate 130. Here, since the welding may be performed by laser welding from the outside to the coupled collector plate 130, welding efficiency can be increased, compared to the conventional ultrasonic welding. In addition, the welding is performed from a side surface of the uncoated portion 124 coupled to the collector plate 130, and it is possible to reduce or prevent the welding beams from penetrating into the electrode assembly 120 due to a structure of the collector plate 130 to be described later, thereby reducing or preventing the uncoated portion 124 and the rest of the electrode assembly 120 from being damaged by the welding beams.

The collector plate 130 is coupled to the uncoated portion 124 from the side surface (a surface facing an end of the case) of the uncoated portion 124. The collector plate 130 is coupled to at least a part of the uncoated portion 124 connected to the positive electrode plate 121 and the negative electrode plate 122 by welding. The following description will be made by way of example with regard to a case in which the collector plate 130 is coupled to one side of the uncoated portion 124 connected to the positive electrode plate 121.

The collector plate 130 includes a first collector plate 131 and a second collector plate 132 coupled to each other and to be coupled to the uncoated portion 124. The collector plate 130 is coupled to one side of the uncoated portion 124 through the pair of first and second collector plates 131 and 132.

The first collector plate 131 includes a first plate 131a and a plurality of first protrusions 131b protruding from the first plate 131a in a first direction. The first plate 131a is formed or positioned along a side surface of the uncoated portion 124 in the first direction, and the first protrusions 131b is located inside the uncoated portion 124 and extend in the first direction. Here, the first protrusions 131b are formed to have a step 131c from the first plate 131a. Therefore, the first protrusions 131b are inserted into the inside of the uncoated portion 124 from the side surface to then be positioned inside the uncoated portion 124.

In addition, each of the first protrusions 131b includes an inclined surface 131d formed on each of the side surfaces, e.g., a side surface crossing the end surface of the electrode assembly. The inclined surface 131d has a first angle θ1 with respect to a bottom surface, e.g., a surface facing the end surface of the case 110, of the uncoated portion 124 when positioned inside the uncoated portion 124. Accordingly, the first protrusions 131b may have a cross section having a shape of an inverted trapezoid. In addition, as will be described later, a protrusion 132b of the second collector plate 132 is formed to have a slope corresponding to the inclined surface 131d of each of the first protrusions 131b of the first collector plate 131, so that the protrusions of the first collector plate 131 and the second collector plate 132 are engaged with and coupled to each other.

In addition, grooves 131e formed between the first protrusions 131b serve to define or divide and place the uncoated portion 124 when they are engaged with the second protrusions 132b of the second collector plate 132. The first protrusions 131b are engaged with the second collector plate 132 to fix the uncoated portion 124 and then coupled to the uncoated portion 124 by welding. Here, since the uncoated portion 124 is positioned in the grooves 131e along the first protrusions 131b, the welding may be performed along edges of the first protrusions 131b.

The second collector plate 132 is engaged with and coupled to the first collector plate 131 such that the uncoated portion 124 is positioned between the first collector plate 131 and the second collector plate 132 coupled to each other. The second collector plate 132 includes a second plate 132a formed along the uncoated portion 124 in the first direction and a plurality of second protrusions 132b extending from the second plate 132a in the first direction.

The second plate 132a is positioned along a side surface of the uncoated portion 124 so as to correspond to the first plate 131a of the first collector plate 131. The second protrusions 132b are formed to have a step 132c with respect to the second plate 132a. Therefore, the second protrusions 132b are positioned within the uncoated portion 124, and serve to define or divide and place the uncoated portion 124 in the grooves 132e formed between the second protrusions 132b when they are engaged with the first protrusions 131b of the first collector plate 131.

The second protrusions 132b have an inclined surface 132d shaped to correspond to the first protrusions 131b of the first collector plate 131. The inclined surface 132d is formed to have a second angle θ2 with respect to a bottom surface on which the second collector plate 132 is inserted into the uncoated portion 124. The second angle δ2 forms a supplementary angle S with the first angle δ1 of the inclined surface 131d formed on the first protrusions 131b. That is, a sum of the second angle δ2 and the first angle δ1 is 180 degrees. Therefore, each of the second protrusions 132b may have a trapezoidal shape and may be vertically symmetrical (e.g., when the first protrusion is rotated by 180 degrees, it would match the shape of the second protrusion) to the first protrusions 131b. In addition, the second protrusions 132b are horizontally positioned so as to correspond to the grooves 131e formed between the first protrusions 131b. Therefore, when the second collector plate 132 is coupled to the first collector plate 131, the second protrusions 132b may be engaged with and coupled to the first protrusions 131b.

In addition, as shown in FIG. 6, after the second protrusions 132b are coupled to the first protrusions 131b, the laser welding beams are applied to the collector plate 130. The laser welding beams are applied to a boundary surface 133 between the first protrusions 131b and the second protrusions 132b to perform welding. Since the boundary surface 133 is inclined or deviated (e.g., to be at an angle) with respect to a direction in which laser welding beams are applied as indicated by dotted lines in FIG. 6, the welding beams may not penetrate into the collector plate 130, thereby reducing or preventing the welding beams from penetrating into the uncoated portion 124. Therefore, when laser welding is performed on the uncoated portion 124, the collector plate 130 may reduce or prevent the uncoated portion 124 and the rest of the electrode assembly 120 from being damaged by the welding beams.

The collector terminal 140 is coupled to the collector plate 130. The collector terminal 140 is coupled to the first plate 131a of the first collector plate 131 of the collector plate 130 by welding. The collector terminal 140 is welded to the collector plate 130 in a state in which it is attached to the surface of the first plate 131a opposite to the surface coupled or connected to the uncoated portion 124.

The collector terminal 140 includes a first plate 141 extending in a first direction and coupled to the collector plate 130, a second plate 142 extending from the first plate 141 in a second direction perpendicular to the first direction, and an electrode terminal 143 protruding upwardly from the second plate 142 in the first direction. The electrode terminal 143 protrudes to or extends through an upper portion of the cap plate 160 to then be coupled or connected to a charging/discharging circuit. In addition, a male screw thread is formed on the outer periphery of the electrode terminal 143 to then be engaged with the nut 180.

The first dielectric member 150 is formed on the collector terminal 140. The first dielectric member 150 is formed between the second plate 142 of the collector terminal 140 and the cap plate 160. The first dielectric member 150 electrically isolates the collector terminal 140 from the cap plate 160. In addition, the first dielectric member 150 includes a terminal hole 151 formed therein to allow the electrode terminal 143 of the collector terminal 140 to pass through to protrude upwardly therefrom.

The cap plate 160 is formed on the case 110 and seals the case 110. The cap plate 160 is coupled to the case 110 to reduce or prevent an electrolytic solution contained in the case 110 from leaking. The cap plate 160 includes the terminal hole 161, and allows the electrode terminal 143 to pass through the terminal hole 161 to protrude upwardly therefrom. In addition, the cap plate 160 has a vent 162 positioned at a roughly or approximately central portion, and when internal gases are generated in the case 110 due to over-charge, the vent 162 is opened earlier than other parts, thereby releasing the internal gases.

The second dielectric member 170 is formed between the cap plate 160 and the electrode terminal 143 of the collector terminal 140. The second dielectric member 170 electrically isolates the cap plate 160 from the electrode terminal 143 of the collector terminal 140. In addition, since the second dielectric member 170 is formed on the cap plate 160, the nut 180 is electrically isolated from the cap plate 160 when the second dielectric member 170 is coupled to the nut 180.

The nut 180 is formed on the second dielectric member 170. The nut 180 includes a female screw thread formed therein, and is coupled to the electrode terminal 143 of the collector terminal 140. The nut 180 fixes the electrode terminal 143 of the collector terminal 140, thereby fixing the position of the collector terminal 140 and the position of the electrode assembly 120.

Hereinafter, a configuration of a secondary battery according to another embodiment of the present invention will be described.

Figure 7:
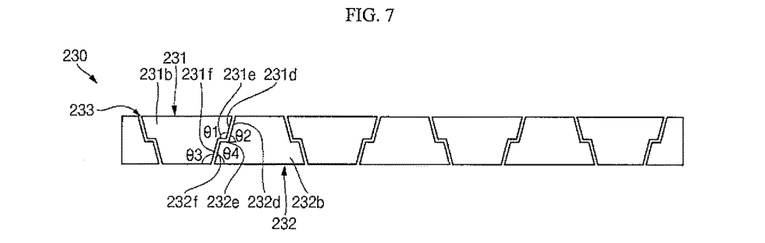
FIG. 7 is a cross-sectional view illustrating an electrode assembly of a secondary battery according to another embodiment of the present invention.

FIG. 7 is a cross-sectional view illustrating an electrode assembly of a secondary battery according to another embodiment of the present invention. Components and operations that are substantially the same as those of the previous embodiment are denoted by the same reference numerals, and the following description will focus on differences between the current embodiment and the previous embodiment.

Referring to FIG. 7, the secondary battery according to another embodiment of the present invention is different from the secondary battery according to the previous embodiment in view of a configuration of a collector plate 230.

The collector plate 230 includes a first collector plate 231 and a second collector plate 232 engaged with and coupled to each other.

The first collector plate 231 includes a plurality of first protrusions 231b. Each of the first protrusions 231b includes a first inclined surface 231d having a first angle θ1, a connecting surface 231e connected to the first inclined surface 231d and extending inwardly in a horizontal direction, and a second inclined surface 231f having a third angle θ3 with respect to the connecting surface 231e. Therefore, the first collector plate 230 is shaped to have a step from the connecting surface 231e.

Meanwhile, the second collector plate 232 includes a plurality of second protrusions 232b. Each of the second protrusions 232b includes a first inclined surface 232d having a second angle θ2, a connecting surface 232e connected to the second inclined surface 232d and extending inwardly in a horizontal direction, and a second inclined surface 232f having a fourth angle θ4 with respect to the connecting surface 232e. Therefore, the second protrusions 232b are disposed to be vertically symmetrical to the first protrusions 231b and are horizontally disposed to be positioned between the first protrusions 231b.

In addition, the second angle θ2 is a supplementary angle with respect to the first angle θ1, and the fourth angle θ4 is a supplementary angle with respect to the third angle θ3. Therefore, the first protrusions 231b and the second protrusions 232b may be matched with each other. Accordingly, a boundary surface 233 between the first protrusions 231b and the second protrusions 232b engaged with each other may form an inclination having a step by the connecting surfaces 231e and 232e with respect to the vertically applied welding beams. Therefore, the welding beams are reduced or prevented from being applied to the inside of the collector plate 230, thereby reducing or preventing the uncoated portion 124 and the rest of the electrode assembly 120 from being damaged.

Hereinafter, a configuration of a secondary battery according to still another embodiment of the present invention will be described.

Figure 8:
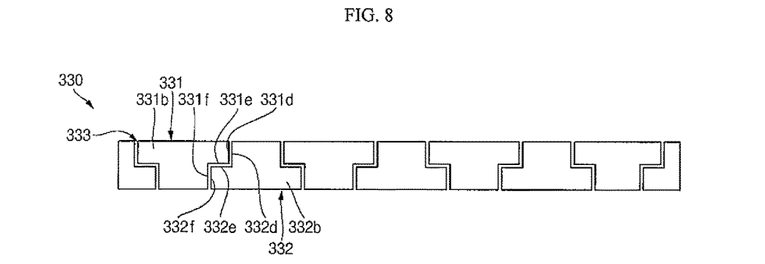
FIG. 8 is a cross-sectional view illustrating an electrode assembly of a secondary battery according to still another embodiment of the present invention.

FIG. 8 is a cross-sectional view illustrating an electrode assembly of a secondary battery according to still another embodiment of the present invention.

Referring to FIG. 8, the secondary battery according to still another embodiment of the present invention is different from the secondary battery according to the previous embodiment in view of a configuration of a collector plate 330.

The collector plate 330 includes a first collector plate 331 and a second collector plate 332 engaged with and coupled to each other.

The first collector plate 331 includes a plurality of first protrusions 331b. Each of the first protrusions 331b includes a first inclined surface 331d formed at a right angle, a connecting surface 331e connected to the first inclined surface 331d and extending inwardly in a horizontal direction, and a second inclined surface 331f formed at a right angle with respect to the connecting surface 331e. Therefore, the first collector plate 330 is shaped to have a step from the connecting surface 331e.

Meanwhile, the second collector plate 332 includes a plurality of second protrusions 332b. Each of the second protrusions 332b includes a first inclined surface 332d formed at a right angle, a connecting surface 332e connected to the second inclined surface 332d and extending inwardly in a horizontal direction, and a second inclined surface 332f formed at a right angle with respect to the connecting surface 332e. Therefore, the second protrusions 332b are configured to be vertically symmetrical to the first protrusions 331b, and are horizontally disposed to be positioned between the first protrusions 331b.

In addition, a boundary surface 333 between the first protrusions 331b and the second protrusions 332b engaged with each other may form an inclination having a step by the connecting surfaces 331e and 332e with respect to the vertically applied welding beams. Therefore, welding beams are reduced or prevented from being applied to the inside of the collector plate 330, thereby reducing or preventing the uncoated portion 124 and the rest of the electrode assembly 120 from being damaged.

Hereinafter, a configuration of a secondary battery according to still another embodiment of the present invention will be described.

Figure 9:
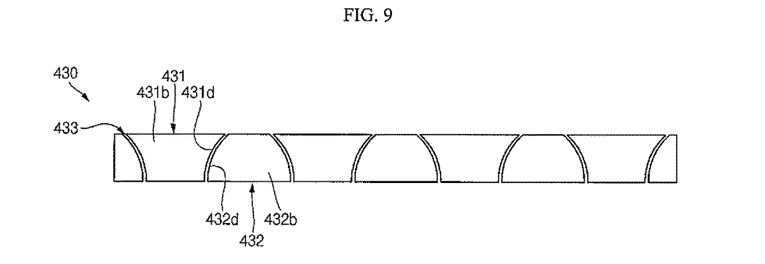
FIG. 9 is a cross-sectional view illustrating an electrode assembly of a secondary battery according to still another embodiment of the present invention.

FIG. 9 is a cross-sectional view illustrating an electrode assembly of a secondary battery according to still another embodiment of the present invention.

Referring to FIG. 9, the secondary battery according to still another embodiment of the present invention is different from the secondary battery according to the previous embodiment in view of a configuration of a collector plate 430.

The collector plate 430 includes a first collector plate 431 and a second collector plate 432 engaged with and coupled to each other.

The first collector plate 431 includes a plurality of first protrusions 431b. Each of the first protrusions 431b includes a first inclined surface 431d that is a concave surface having a set or predetermined curvature.

The second collector plate 432 includes a plurality of second protrusions 432b. Each of the second protrusions 432b includes a second inclined surface 432d that is a convex surface having a set or predetermined curvature.

Curves forming the first protrusions 431b and the second protrusions 432b are formed to have the same curvature. Therefore, when the first collector plate 431 and the second collector plate 432 are coupled to each other, the first protrusions 431b and the second protrusions 432b may be matched with each other.

However, shapes of the curved surfaces 431d and 432d of the first protrusions 431b and the second protrusions 432b may be interchanged, and the curved surfaces 431d and 432d may have any suitable shapes so long as they have the same curvature so as to be matched with each other.

In addition, a boundary surface 433 between the first protrusions 431b and the second protrusions 432b coupled to each other forms a path deviating (e.g., to be at an angle) from the vertically applied welding beams by the curved surfaces 431d and 432d. Therefore, the welding beams are reduced or prevented from being applied to the inside of the collector plate 430, thereby reducing or preventing the uncoated portion 124 and the electrode assembly 120 from being damaged.

Although the present invention has been described with reference to certain example embodiments thereof, it will be understood by those skilled in the art that a variety of modifications and variations may be made to the present invention without departing from the spirit or scope of the present invention defined in the appended claims, and their equivalents.

What is claimed is:

1. A secondary battery comprising:
a case having an internal space;
an electrode assembly accommodated in the case, the electrode assembly having a coated portion coated with an active material and an uncoated portion without the active material; and
a collector plate coupled to the uncoated portion, the collector plate comprising a first collector plate comprising first protrusions and a second collector plate comprising second protrusions, the first and second protrusions each having a length extending along a first direction and a thickness extending along a third direction crossing the first direction;
wherein the collector plate and the electrode assembly face each other in the third direction,
wherein the first protrusions of the first collector plate and the second protrusions of the second collector plate are engaged with each other with the uncoated portion interposed therebetween, and a boundary surface between the first protrusions and the second protrusions is configured to deviate with respect to the third direction,
wherein each of the first protrusions includes a first inwardly inclined surface, and each of the second protrusions includes a second inwardly inclined surface configured to be coupled to a corresponding one of the first protrusions to form the boundary surface,
wherein a supplementary angle is formed by a first angle formed between the first inclined surface and a surface normal to the third direction and a second angle formed between the second inclined surface of the second protrusions and the surface normal to the third direction, and
wherein the first angle is greater than 90° and the second angle is less than 90°.

2. The secondary battery of claim 1, wherein the boundary surface between the first protrusions and the second protrusions is configured to deviate with respect to the third direction in which welding beams are applied to couple the collector plate to the uncoated portion.

3. The secondary battery of claim 1, wherein the second protrusions are disposed to be vertically symmetrical to the first protrusions.

4. The secondary battery of claim 1, wherein each of the first protrusions includes the first inwardly inclined surface along the third direction, an extension part extending inwardly from the first inclined surface along a second direction crossing the first and third directions, and a second inclined surface further extending inwardly along the third direction from the extension part, and each of the second protrusions includes the first inwardly inclined surface along the third direction configured to be coupled to the first protrusion, an extension part extending inwardly along the second direction from the first inclined surface, and a second inclined surface further extending inwardly along the third direction from the extension part.

5. The secondary battery of claim 4, wherein an angle formed between the second inclined surface of the first protrusions and the uncoated portion is 90 degrees or greater.

6. The secondary battery of claim 4, wherein an angle formed between the second inclined surface of the second protrusions and the uncoated portion is 90 degrees or less.

7. The secondary battery of claim 1, wherein each of the first protrusions has a first curved surface having a first curvature, and each of the second protrusions has a second curved surface having a second curvature.

8. The secondary battery of claim 7, wherein the first curved surface and the second curved surface have the same curvature.

9. The secondary battery of claim 7, wherein the first curved surface is a convex surface or a concave surface, and the second curved surface is shaped to be engaged with the first curved surface.

10. The secondary battery of claim 1, wherein the uncoated portion and the collector plate are coupled to each other by laser welding.

11. A secondary battery comprising:
a case having an internal space;
an electrode assembly accommodated in the case, the electrode assembly having a coated portion coated with an active material and an uncoated portion without the active material; and
a collector plate coupled to the uncoated portion, the collector plate comprising a first collector plate comprising first protrusions and a second collector plate comprising second protrusions, the first and second protrusions each having a thickness extending along a third direction;
wherein the collector plate and the electrode assembly face each other in the third direction,
the first protrusions of the first collector plate and the second protrusions of the second collector plate are engaged with each other with the uncoated portion interposed therebetween;
the first protrusions and the second protrusions each have a substantially T-shaped cross-section along the third direction, and
the first protrusions and the second protrusions are interdigitated along the third direction.

* * * * *